United States Patent
Lee et al.

(10) Patent No.: US 9,330,253 B2
(45) Date of Patent: May 3, 2016

(54) APPARATUS AND METHOD FOR PROCESSING APPLICATION PACKAGE IN PORTABLE TERMINAL

(75) Inventors: Sang-Cheol Lee, Seoul (KR); Seung-Hwan Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 13/452,776

(22) Filed: Apr. 20, 2012

(65) Prior Publication Data

US 2012/0272072 A1 Oct. 25, 2012

(30) Foreign Application Priority Data

Apr. 25, 2011 (KR) ........................ 10-2011-0038415

(51) Int. Cl.
*H04L 29/06* (2006.01)
*G06F 21/51* (2013.01)
*G06F 21/12* (2013.01)
*G06F 21/71* (2013.01)
*G06F 21/10* (2013.01)

(52) U.S. Cl.
CPC ............... *G06F 21/51* (2013.01); *G06F 21/10* (2013.01); *G06F 21/125* (2013.01); *G06F 21/71* (2013.01)

(58) Field of Classification Search
CPC ................... H04L 2463/101; H04L 2209/603; H04L 63/123; H04L 63/10; G06F 21/10
See application file for complete search history.

(56) References Cited

U.S. PATENT DOCUMENTS

| 8,312,423 | B1 * | 11/2012 | Webb et al. ................... 717/106 |
| 2002/0092003 | A1 * | 7/2002 | Calder et al. ................... 717/138 |
| 2005/0278716 | A1 * | 12/2005 | Koppen et al. ................ 717/168 |
| 2011/0179268 | A1 * | 7/2011 | Strom et al. ................... 713/156 |

FOREIGN PATENT DOCUMENTS

KR 10-2006-0015797 2/2006

* cited by examiner

*Primary Examiner* — Fatoumata Traore
*Assistant Examiner* — Kendall Dolly (57) ABSTRACT

An apparatus and method for improving the security of an application package from a user abnormally acquiring a system supreme authority in a portable terminal are provided. The apparatus includes an application manager for, at application package generation, collecting data for package generation, performing a compiling process for the collected data, encrypting an execution file of the application package among the compiled data, and packaging the compiled data comprising the encrypted execution file.

17 Claims, 5 Drawing Sheets

APPARATUS AND METHOD FOR PROCESSING APPLICATION PACKAGE IN PORTABLE TERMINAL

CROSS-REFERENCE TO RELATED APPLICATION(S) AND CLAIM OF PRIORITY

The present application is related to and claims priority under 35 U.S.C. §119(a) of a Korean patent application filed in the Korean Intellectual Property Office on Apr. 25, 2011 and assigned Serial No. 10-2011-0038415, the contents of which are herein incorporated by reference.

TECHNICAL FIELD OF THE INVENTION

The present disclosure relates to an apparatus and method for improving the security of an application package from a user who has illegally acquired a system supreme authority. More particularly, the present disclosure relates to an apparatus and method for encrypting and packaging an execution file of the application package.

BACKGROUND OF THE INVENTION

In recent years, portable terminals are in trend of the sudden spread of use because of the convenience of carrying. According to this, service providers (i.e., system manufacturers) are competitively developing terminals having more convenient functions to guarantee many users.

For example, the portable terminal includes a mobile communication terminal, a smart phone, a multimedia player, a portable game machine and the like. The mobile communication terminal is providing functions of a phone book, a game, a scheduler, a Short Message Service (SMS), a Multimedia Message Service (MMS), a Broadcast Message Service (BMS), an Internet service, an electronic (e)-mail, a morning, wakeup call, a MPEG-1 Audio Layer 3 (MP3), a digital camera, and such.

Recently, it is allowed to be able to download an application registered by a supplier who manufactures an application package, and install the application in a portable terminal.

The above application package is installed in a specific folder of the portable terminal, and is executed according to a user's execution request.

The authority of installation and execution of the application package is granted only to a user having a specific authority (i.e., an authority to access an installation folder, a writing authority, an execution authority and the like). That is, only a user matching with an account having downloaded (i.e., paid or free download) the application package can have access.

However, in recent years, illegal acts of some hackers who intend to acquire a system authority of a portable terminal are happening. The illegal acts are that the hackers acquire a root authority, i.e., a system supreme authority and make illegal use of the original application package of the portable terminal.

Due to this, a manufacturer of the portable terminal intends to prevent the hackers from acquiring the system authority, but realistically fails to stop hackers' technologies.

This will cause a problem that application package manufacture enterprises are reluctant to develop programs.

To solve the above problem, there is a need for an apparatus and method for preventing a user who abnormally acquires a system supreme authority from making illegal use of an application package.

SUMMARY OF THE INVENTION

To address the above-discussed deficiencies of the prior art, it is a primary aspect of the present disclosure is to substantially solve at least the above problems and/or disadvantages and to provide at least the advantages below. Accordingly, an aspect of the present disclosure is to provide an apparatus and method for improving the security of an application package in a portable terminal.

Another aspect of the present disclosure is to provide an apparatus and method for encrypting an execution file of an application package in a portable terminal A further aspect of the present disclosure is to provide an apparatus and method for, upon application package execution, decrypting an execution file in a portable terminal.

The above aspects are achieved by providing an apparatus and method for processing an application package in a portable terminal.

In accordance with an aspect of the present disclosure, an apparatus for processing an application package in a portable terminal is provided. The apparatus includes an application manager for, at application package generation, collecting data for package generation, performing a compiling process for the collected data, encrypting an execution file of the application package among the compiled data, and packaging the compiled data comprising the encrypted execution file.

In accordance with another aspect of the present disclosure, a method for processing an application package in a portable terminal is provided. The method includes, at application package generation, collecting data for package generation, performing a compiling process for the collected data, encrypting an execution file of the application package among the compiled data, and packaging the compiled data comprising the encrypted execution file.

In accordance with further aspect of the present disclosure, an apparatus for processing an application package in a portable terminal is provided. The apparatus includes a package generator and an encryption unit. At application package generation, the package generator collects data for package generation and performs a compiling process for the collected data. The encryption unit encrypts an execution file of the application package among the compiled data. The package generator packages the compiled data comprising the encrypted execution file.

Before undertaking the DETAILED DESCRIPTION OF THE INVENTION below, it may be advantageous to set forth definitions of certain words and phrases used throughout this patent document: the t5erms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure.

An apparatus and method for encrypting an execution file of an application package and improving the security of the application package in a portable terminal according to an exemplary embodiment of the present disclosure are described below. The portable terminal is a device capable of generating or executing the application package, and can include a desktop computer, a notebook computer, a mobile communication terminal, a multimedia player and the like.

Figure 1:
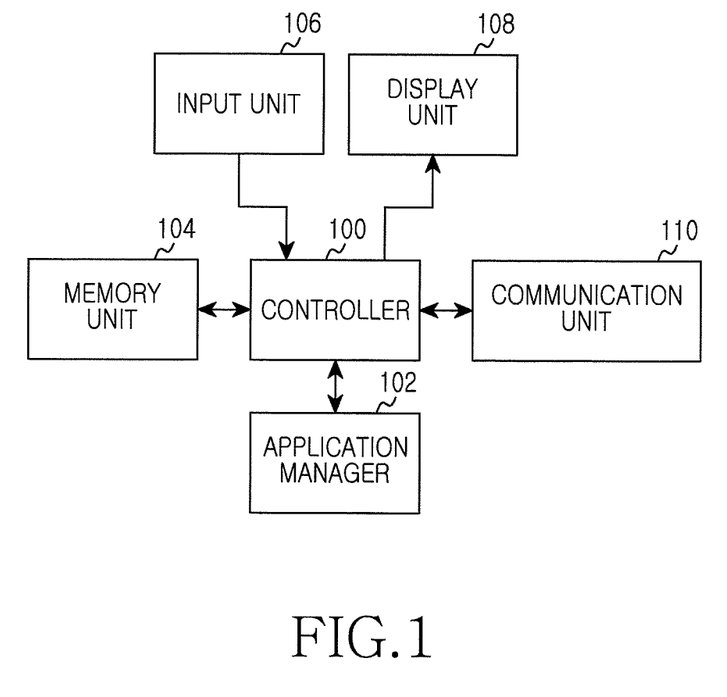
FIG. 1 illustrates a construction of a portable terminal for processing an application package according to the present disclosure.

FIG. 1 illustrates a construction of a portable terminal for processing an application package according to the present disclosure.

Referring to FIG. 1, the portable terminal can include a controller 100, an application manager 102, a memory unit 104, an input unit 106, a display unit 108, and a communication unit 110.

The controller 100 of the portable terminal controls the general operation of the portable terminal. For instance, the controller 100 performs processing and control for voice call and data communication. In addition to a common function, according to the present disclosure, the controller 100 processes to, at application package generation, encrypt an execution file of an application package, and may permit only a licensed user to have access to the encrypted execution file of the application package, so as to prevent a user who abnormally acquires a system supreme authority from making illegal use of the application package. That is, the controller 100 encrypts the execution file by means of a Digital Rights Management (DRM) technology to prevent other people from accessing the execution file.

The method described hereunder of the present invention may be provided as one or more instructions in one or more software modules stored in the storage device. The software modules may be executed by the controller.

The application manager 102 generates an application package by collecting and compiling application package driving data, i.e., a source code, a resource, an asset, a manifest and the like and then packaging the compiled data as one file. Further, the application manager 102 encrypts a code file for execution of an application package according to an exemplary embodiment of the present disclosure. This is to prevent a user who abnormally acquires a system supreme authority from accessing an application package.

Also, the application manager 102 loads a code file included in an application package intended for execution (i.e., a code file for execution of an application package) and then, decrypts the loaded code file. That is, in an example where the loaded code file has not been encrypted, the application manager 102 processes to drive the application package.

In contrast, in an example where the loaded code file has been encrypted, the application manager 102 processes to decrypt the encrypted code file only for a licensed user and then, drive the application package by the decrypted code file. Further, the application manager 102 is described below in detail in FIG. 2.

The method executed by the application manager may be provided as one or more instructions in one or more software modules stored in the storage device. In that case, the software modules may be executed by the controller.

The memory unit 104 preferably includes, for example, a Read Only Memory (ROM), a Random Access Memory (RAM), a flash ROM, and such. The ROM stores a microcode of a program for processing and controlling the controller 100 and the application manager 102 and a variety of reference data.

The RAM, a working memory of the controller 100, stores temporary data generated in execution of a variety of programs. The flash ROM stores a diversity of updateable depository data such as a phone book, an outgoing message, and an incoming message. Further, the memory unit 104 stores authentication information used for determining if a user is licensed to execute an application package according to the present disclosure.

The method described hereunder of the present invention or the method executed by the application manager may be provided as one or more instructions in one or more software modules stored in the storage device. The software modules may be executed by the controller.

The input unit 106 includes numeral key buttons '0' to '9', a menu button, a cancel button, an OK button, a talk button, an end button, an Internet button, navigation key buttons, and a plurality of function keys such as a character input key. The input unit 106 provides key input data corresponding to a key pressed by a user to the controller 100.

The display unit 108 displays state information generated during operation of the portable terminal, characters, a large amount of moving pictures and still pictures and the like. The display unit 108 may be a color Liquid Crystal Display (LCD), an Active Matrix Organic Light Emitting Diode (AMOLED) and the like. In an example embodiment where the display unit 108 includes a touch input device and is applied to a portable terminal of a touch input scheme, the display unit 108 can be used as an input device of the portable terminal. Further, the display unit 108 outputs information of an application driven by a decrypted execution file according to the present disclosure. A touch sensitive display, called as a touch screen, may be used as the display. Touch input may be performed via the touch sensitive display.

The communication unit 110 performs a function of transmitting/receiving and processing a wireless signal of data input/output through an antenna (not illustrated). For example, in a transmission mode, the communication unit 110 performs a function of processing original data through channel coding and spreading, converting the original data into a Radio Frequency (RF) signal, and transmitting the RF signal. In a reception mode, the communication unit 110 performs a function of converting a received RF signal into a baseband signal, processing the baseband signal through despreading and channel decoding, and restoring the signal to original data.

A role of the application manager 102 can be implemented by the controller 100 of the portable terminal. However, in the present disclosure, these are separately constructed and shown as an exemplary construction for description convenience, and never intend to limit the scope of the present disclosure. It will be understood by those skilled in the art that various modifications of construction can be made within the scope of the present disclosure. For example, construction may be such that all of these are processed in the controller 100.

Figure 2:
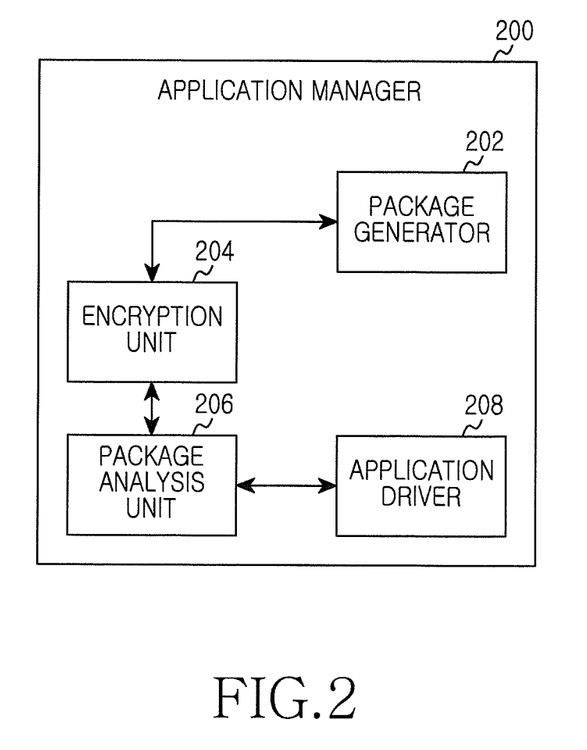
FIG. 2 illustrates a construction of an application manager according to an illustrative embodiment of the present disclosure.

FIG. 2 illustrates a construction of an application manager according to an illustrative embodiment of the present disclosure.

Referring to FIG. 2, the application manager 200 can include a package generator 202, an encryption unit 204, a package analysis unit 206, and an application driver 208.

The package generator 202 performs an operation of generating an application to be provided to a plurality of users.

Generally, the package generator 202 collects application package driving data, i.e., a source code, a resource, an asset, a manifest and the like and performs a compiling process. After that, the package generator 202 packages the compiled data as one file, generating an application package.

The above application package has a problem that the application package is illegally distributed because the application package is transferred to other terminals by a user who abnormally acquires a system supreme authority.

To solve the above problem, the package generator 202 according to the present disclosure encrypts an execution file of the application package at the time of generating the application package, restricting an access to the application package.

The package generator 202 of the application manager 200 provides a code file matching with an execution file among compiled data to the encryption unit 204, and the encryption unit 204 encrypts the code file and again provides the encrypted code file to the package generator 202 to impose restrictions such that only a licensed user can have access to the application package.

After that, the package generator 202 generates the encrypted code file and the compiled data as one package.

According to this, the package file is prevented from being accessed by a non-licensed user, in other words, a user abnormally acquiring a system supreme authority.

In an example where a request for execution of the application package including the encrypted code file is sensed, the package analysis unit 206 loads and provides the encrypted code file to the encryption unit 204 to decrypt the encrypted code file.

After that, the package analysis unit 206 processes to provide the decrypted code file to the application driver 208 to drive the application package. Here, the application driver 208 refers to a virtual machine capable of executing the application package.

On the other hand, in an example where a request for execution of an application package including a non-encrypted code file is sensed, the package analysis unit 206 processes an existing scheme of loading the non-encrypted code file and providing the loaded code file to the application driver 208.

Figure 3:
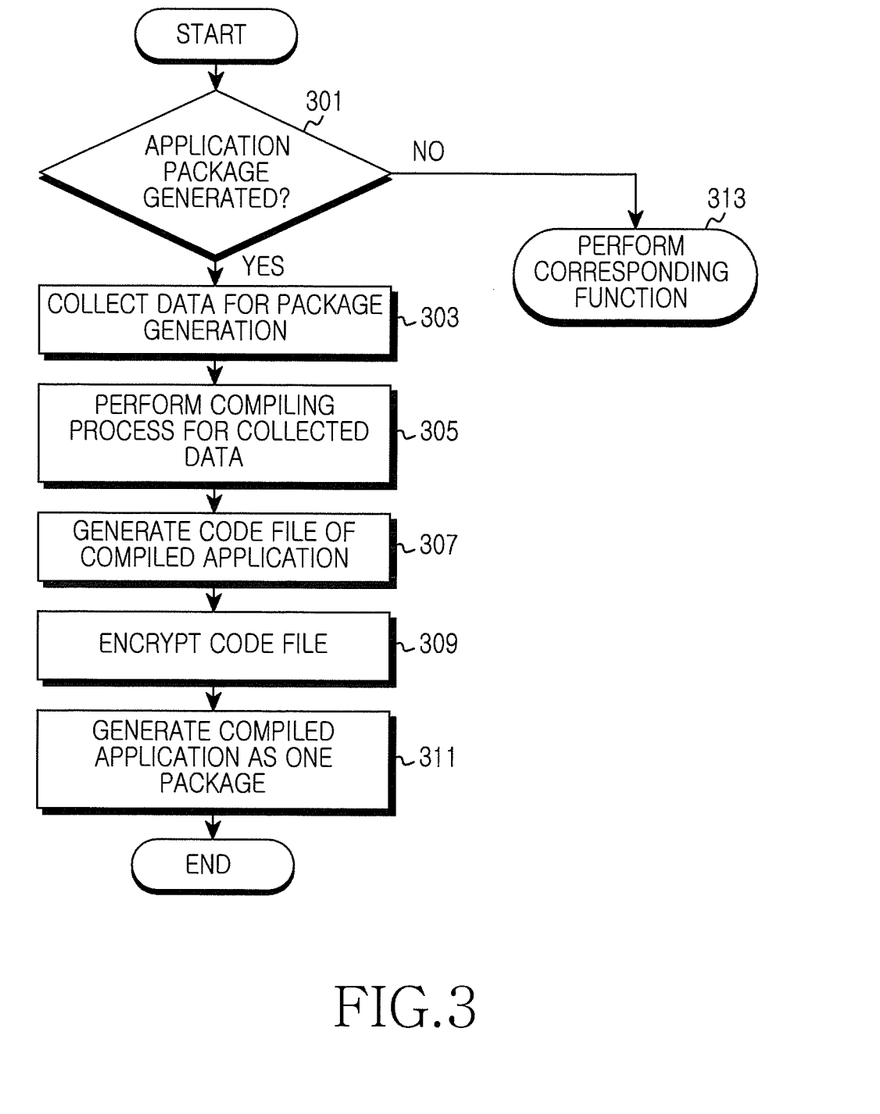
FIG. 3 illustrates a process of generating an application package in a portable terminal according to an illustrative embodiment of the present disclosure.

FIG. 3 illustrates a process of generating an application package in a portable terminal according to an illustrative embodiment of the present disclosure.

Referring to FIG. 3, in step 301, the portable terminal identifies if the portable terminal generates an application package. That is, the portable terminal identifies whether to perform a process of generating an application to be provided to a plurality of users. If the application package is generated, the portable terminal proceeds to step 313 to perform a corresponding function.

Next, if the application package is generated, the portable terminal proceeds to step 303 and collects data for package generation. Here, the data for package generation, which is application package driving data, can include a source code, a resource, an asset, a manifest and the like. Also, the application package refers to packaging of the data as one file through a compiling process.

After that, the portable terminal proceeds to step 305 and performs a compiling process for the collected data and then, the portable terminal proceeds to step 307 and generates a code file of an application through the compiling process. Here, the code file refers to a code file for execution of the application package intended for generation.

Next, the portable terminal proceeds to step 309 and performs a process of encrypting the generated code file. Here, the encryption process is to prevent the application intended for generation from being executed in a non-licensed device. Generally, in an example where a root authority, which is a system supreme authority driving an application, is robbed by hackers, the original application package is leaked, so even other non-licensed systems can execute an application package by the code file. To address the above problem, the present disclosure encrypts a code file for execution of an application package for a licensed system only to drive the application package. Further, the portable terminal can generate authentication information granting access to an encrypted code file in the process of encrypting the code file.

After that, the portable terminal proceeds to step 311 and performs a process of generating compiled data as one package and then, terminates an algorithm according to the exemplary embodiment of the present disclosure.

Figure 4:
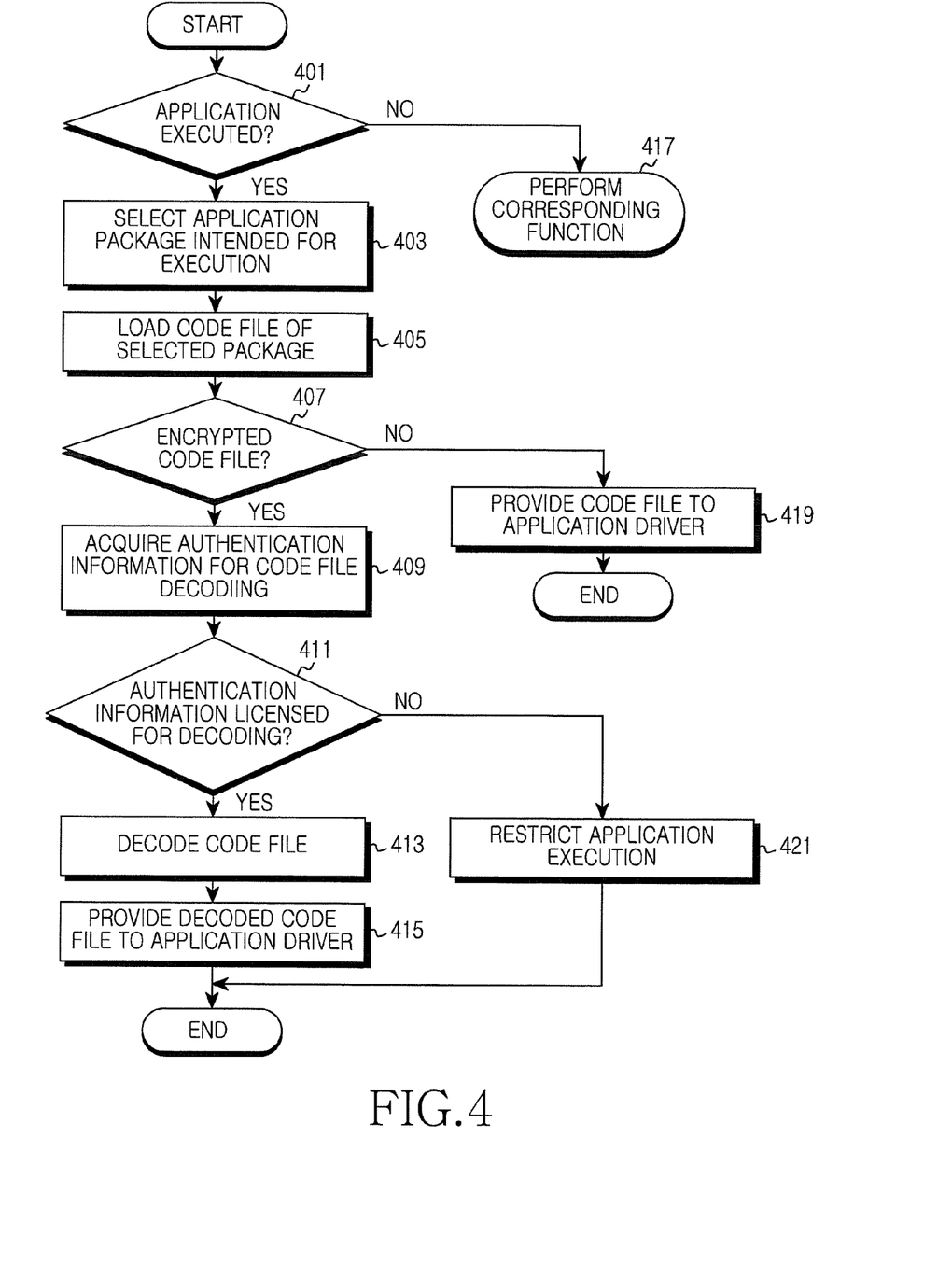
FIG. 4 illustrates a process of executing an application package in a portable terminal according to an illustrative embodiment of the present disclosure.

FIG. 4 illustrates a process of executing an application package in a portable terminal according to an illustrative embodiment of the present disclosure.

Referring to FIG. 4, in step 401, the portable terminal identifies whether to execute an application. If the application is executed, the portable terminal proceeds to step 417 to perform a corresponding function.

In an example where it is identified in step 401 to intend to execute the application, the portable terminal proceeds to step 403 and selects a package of the application to be executed and then, the portable terminal proceeds to step 405 and loads a code file of the selected package. Here, the code file refers to a file executing the selected application package.

Next, the portable terminal proceeds to step 407 and identifies if the loaded code file is an encrypted code file.

In an example where it is identified in step 407 that a non-encrypted code file is loaded, the portable terminal proceeds to step 419 and provides the non-encrypted code file to an application driver such that the selected application is executed. This is similar to a conventional application package execution process.

On the other hand, in an example where it is identified in step 407 that the encrypted code file is loaded, the portable terminal proceeds to step 409 and acquires authentication information for decoding the loaded encrypted code file. This is to authenticate if a user is a licensed user, in order to allow only the licensed user to decode the encrypted code file.

Next, the portable terminal proceeds to step 411 and identifies if the acquired authentication information is authentication information licensed for decoding.

If it is identified in step 411 that authentication information not licensed for decoding is acquired, the portable terminal proceeds to step 421 and restricts an execution of an application package.

In contrast, in an example where it is identified in step 411 that authentication information licensed for decoding is acquired, the portable terminal proceeds to step 413 and performs a process of decoding the encrypted code file loaded in step 405.

After that, the portable terminal proceeds to step 415 and provides the decoded code file to an application driver, thereby allowing the execution of the selected application.

Next, the portable terminal terminates an algorithm according to the exemplary embodiment of the present disclosure.

Figure 5:
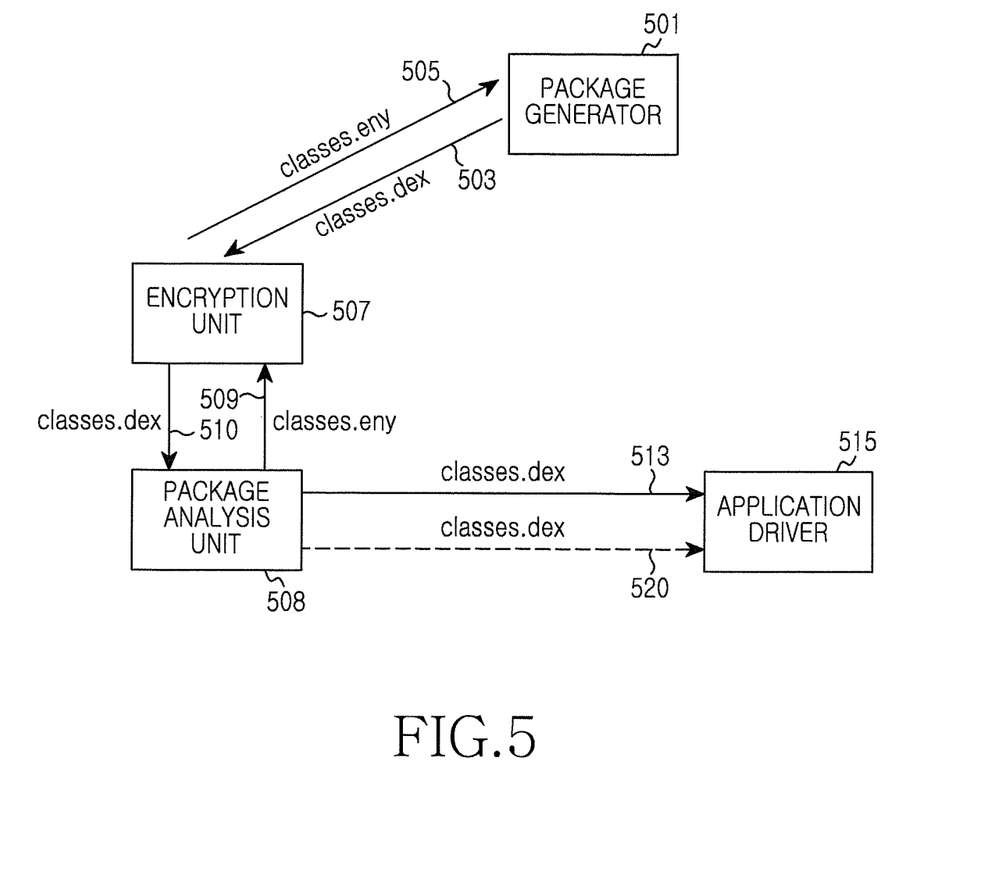
FIG. 5 illustrates a process of processing an application package in a portable terminal according to another illustrative embodiment of the present disclosure.

FIG. 5 illustrates a process of processing an application package in a portable terminal according to another illustrative embodiment of the present disclosure.

Referring to FIG. 5, in one illustrative example, the portable terminal uses an android operation system, and can generate an application package driven in the android operation system. Further, the portable terminal can execute the application package generated to be driven in the android operation system as above. In other examples, other operating systems may be used by the portable terminal.

First, a process of generating an application package through a package generator 501 in the portable terminal is described below.

The package generator 501 collects application package driving data, i.e., a source code, a resource, an asset, a manifest and the like and then, performs a compiling process for the collected data.

After that, the portable terminal encrypts a code file for execution of the application package. For one instance, the package generator 501 provides (503) an execution file 'classes.dex' of an android package among the compiled data to an encryption unit 507 for encryption. That is, the encryption unit 507 encrypts the execution file 'classes.dex' of the android package provided from the package generator 501 and converts the 'classes.dex' into 'classes.eny' and then, provides (505) the encrypted execution file 'classes.eny' to the package generator 501.

According to this, the package generator 501 generates, as one package, the encrypted execution file and the compiled data and provides the application package to a plurality of users.

Next, a process of executing an application package including an encrypted execution file through a package analysis unit 508 in the portable terminal is described below.

In an example where the portable terminal senses a user's input intending to execute an application package, the portable terminal allows the package analysis unit 508 to identify if an execution file of the application package intended for execution has been encrypted.

At this time, the package analysis unit 508 loads the execution file included in the application package and then, identifies if an extension of the loaded execution file is '.eny' or '.dex', thereby grasping encryption or non-encryption. In an example where the package analysis unit 508 loads the execution file with the '.eny' extension, the package analysis unit 508 can determine that the loaded execution file has been encrypted.

In an example of sensing a request for execution of an application package including a non-encrypted execution file, the package analysis unit 508 provides (520) the loaded execution file 'classes.dex' to the application driver 515, and the application driver 515, which is a virtual machine capable of driving the application, executes the provided execution file 'classes.dex'.

On the other hand, in an example of sensing a request for execution of an application package including an encrypted execution file, the package analysis unit 508 provides (509) an encrypted execution file 'classes.eny' to the encryption unit 507. According to this, the encryption unit 507 decodes the encrypted execution file 'classes.eny' and converts the encrypted execution file 'classes.eny' into the decrypted execution file 'classes.dex'. At this time, the encryption unit 507 can perform a decoding process only in an example where authentication information of a user licensed for execution file decoding is confirmed.

After converting the encrypted execution file into the decrypted execution file as above, the encryption unit 507 provides the decrypted execution file to the application driver 515. At this time, the encryption unit 507 may provide (510) and (513) the decrypted execution file to the application driver 515 through the package analysis unit 508. It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, exemplary embodiments of the present disclosure are for preventing an application package from being illegally used by a user abnormally acquiring a system supreme authority and, at the time of generation of the application package, can encrypt an execution file of the application package and allow only a licensed user to have access to the encrypted execution file of the application package, thereby being capable of preventing illegal use by other people.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal apparatus, the apparatus comprising:
a memory configured to store at least one of a non-encrypted application package comprising a non-encrypted execution file or an encrypted application package comprising an encrypted execution file; and
a controller coupled to the memory and configured to:
if an application package stored in the memory is selected, determine whether the selected application package is encrypted using a file extension of an execution file comprised in the selected application package, if the selected application package is non-encrypted, execute the selected application package using the execution file comprised in the selected application package, if the selected application package is encrypted, decrypt the encrypted execution file and execute the selected application package using the decrypted execution file comprised in the selected application package, wherein the encrypted application package comprises a changed file extension according to the encrypted execution file, and upon generation of the application package, collect data for the generation of the application package, perform a compiling process for the collected data, encrypt the execution file of the application package among the compiled data, change the file extension of the encrypted execution file, and generate the application package comprising the encrypted execution file.

2. The portable terminal apparatus of claim 1, wherein the encrypted execution file comprises at least one of a source code, a resource, an asset, and a manifest, which are necessary for the application package generation.

3. The portable terminal apparatus of claim 1, wherein the controller is further configured to decrypt the encrypted execution file using authentication information.

4. The portable terminal apparatus of claim 3, wherein, when the authentication information is information inaccessible to the application package, the controller is further configured to restrict an execution of the application package.

5. The portable terminal apparatus of claim 1, wherein the controller is further configured to generate authentication information permitting access to the encrypted execution file.

6. A method for processing an application package in a portable terminal, the method comprising:

storing at least one of a non-encrypted application package comprising a non-encrypted execution file or an encrypted application package comprising an encrypted execution file, if an application package stored in a memory is selected, determining whether the selected application package is encrypted using a file extension of an execution file comprised in the selected application package, if the selected application package is non-encrypted, executing the selected application package using the execution file comprised in the selected application package, if the selected application package is encrypted, decrypting the encrypted execution file and executing the selected application package using the decrypted execution file comprised in the selected application package, wherein the encrypted application package comprises a changed file extension according to the encrypted execution file, and upon generation of the application package, collecting data for the generation of the application package, performing a compiling process for the collected data, encrypting the execution file of the application package among the compiled data, changing the file extension of the encrypted execution file, and generating the application package comprising the encrypted execution file.

7. The method of claim 6, wherein the encrypted execution file comprises at least one of a source code, a resource, an asset, and a manifest, which are necessary for the application package generation.

8. The method of claim 6, wherein decrypting the encrypted execution file comprises:

decrypting the encrypted execution file using authentication information.

9. The method of claim 8 further comprising:

when the authentication information is information inaccessible to the application package, restricting an execution of the application package.

10. The method of claim 6, further comprising generating authentication information permitting access to the encrypted execution file.

11. A non-transitory computer readable medium embodying a computer program, the computer program comprising computer readable program code that when executed causes at least one processing device to store at least one of a non-encrypted application package comprising a non-encrypted execution file or an encrypted application package comprising an encrypted execution file, if an application package stored in a memory is selected, determining whether the selected application package is encrypted using a file extension of an execution file comprised in the selected application package, if the selected application package is non-encrypted, executing the selected application package using the execution file comprised in the selected application package, if the selected application package is encrypted, decrypting the encrypted execution file and executing the selected application package using the decrypted execution file comprised in the selected application package, wherein the encrypted application package comprises a changed file extension according to the encrypted execution file, upon generation of the application package, collect data for the generation of the application package and perform a compiling process for the collected data, encrypt the execution file of the application package among the compiled data, and change a format of the encrypted execution file including the file extension, package the compiled data comprising the encrypted execution file, and wherein, when an application package is executed, the execution file of the executed application package is identified as encrypted based on the format of the execution file.

12. The non-transitory computer readable medium of claim 11, wherein the computer program further comprises computer readable program code that when executed causes at least one processing device to determine whether the execution file of an application package intended for execution has been encrypted, provide the encrypted execution file to the encryption unit, and decrypt the encrypted execution file.

13. The non-transitory computer readable medium of claim 12, wherein the computer program further comprises computer readable program code that when executed causes at least one processing device to drive the decrypted execution file and drive the application package.

14. The non-transitory computer readable medium of claim 12, wherein the computer program further comprises computer readable program code that when executed causes at least one processing device to generate authentication information permitting access to the encrypted execution file.

15. The non-transitory computer readable medium of claim 12, wherein, after acquiring previously stored authentication information, the computer program further comprises computer readable program code that when executed causes at least one processing device to identify whether the acquired authentication information is information accessible to the application package.

16. The non-transitory computer readable medium of claim 15, wherein, when the acquired authentication information is information inaccessible to the application package, the computer program further comprises computer readable program code that when executed causes at least one processing device to restrict an execution of the application package.

17. The non-transitory computer readable medium of claim 11, wherein the data for the generation of the application package is at least any one of a source code, a resource, an asset, and a manifest, which are necessary for the application package generation.

* * * * *